United States Patent [19]

Saito et al.

[11] Patent Number: 5,455,302
[45] Date of Patent: Oct. 3, 1995

[54] THERMOPLASTIC RESIN COMPOSITIONS

[75] Inventors: Akihiro Saito; Hideyuki Itoi, both of Utsunomiya City, Japan

[73] Assignee: GE Plastics Japan, Tokyo, Japan

[21] Appl. No.: 163,107

[22] Filed: Dec. 7, 1993

[30] Foreign Application Priority Data

Dec. 28, 1992 [JP] Japan ..................... 4-359737

[51] Int. Cl.$^6$ ..................... C08G 63/48
[52] U.S. Cl. ..................... 525/67; 528/199
[58] Field of Search ..................... 525/67; 528/199

[56] References Cited

U.S. PATENT DOCUMENTS

| | | | |
|---|---|---|---|
| 4,180,494 | 12/1979 | Fromuth et al. | 525/67 |
| 4,381,359 | 4/1983 | Idel et al. | 524/117 |
| 5,137,970 | 8/1992 | Eckel et al. | 525/67 |
| 5,194,495 | 3/1993 | Lundy et al. | 525/67 |

*Primary Examiner*—James J. Seidleck
*Assistant Examiner*—Terressa M. Mosley

[57] ABSTRACT

A thermoplastic resin composition which contains 1–99 parts by weight of a polycarbonate resin and/or a copolyester carbonate resin, 99–1 parts by weight of a copolymer containing an aromatic vinyl monomer component, and a vinyl cyanide monomer component, and 1–40 parts by weight, based on 100 parts by weight of the resin and the copolymer combined, of a copolymer obtained by grafting onto a rubbery polymer an acrylic monomer provides polycarbonate resin compositions having excellent low-temperature impact properties and outstanding moldability.

10 Claims, No Drawings

THERMOPLASTIC RESIN COMPOSITIONS

This invention relates to polycarbonate resin compositions having an excellent impact resistance and moldability at low temperatures.

Because polycarbonates have an excellent heat resistance and impact resistance, they are widely used in various applications. However, these have a number of drawbacks, such as their high molding temperature, their poor flowability, and the high thickness dependence of their impact strength.

In order to resolve these problems, attempts were made in Japanese Published Examined Patent Applications [Kokoku] Nos. 38-15,225 (1963) and 39-71 (1964) to blend acrylonitrile-butadiene rubber-styrene resin (ABS resin) or methyl methacrylate-butadiene rubber-styrene resin (MBS resin) in polycarbonate. In addition, Kokoku No. 62-25,179 (1987) proposes an attempt to provide compositions having excellent moldability, impact resistance and weld strength by blending ABS resin and MBS resin in polycarbonate.

However, such prior-art resin compositions were unable to have both a good impact resistance at low temperatures and good moldability.

The object of this invention is to provide polycarbonate resin compostions that have both an excellent impact resistance at low temperatures and also have an excellent moldability.

This invention is a thermoplastic resin composition containing:

(A) 1–99 parts by weight of a polycarbonate resin and/or a copolyester carbonate resin having structural units represented by formula (3)

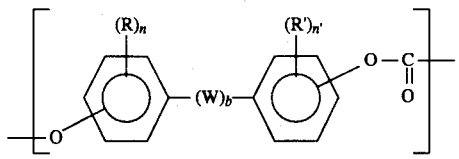

and formula (4)

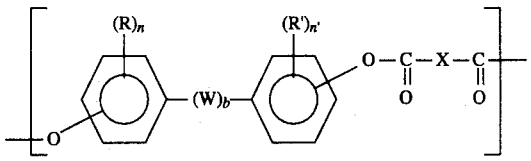

where R and R' each independently represent halogen atoms, monovalent hydrocarbon groups or hydrocarbonoxy groups; W is a divalent hydrocarbon group, —S—, —S—S—, —O—, —S(=O)—, —(O=)S(=O)— or —C(=O)—; n and n' are each independently integers from 0 to 4; X is a divalent aliphatic group having 6–18 carbons; and b is 0 or 1;

(B) 99–1 parts by weight of a copolymer containing as the constituent components of the copolymer:

(a) an aromatic vinyl monomer component, and (b) a vinyl cyanide monomer component; and (C) 1–40 parts by weight, based on 100 parts by weight of (A) and (B) combined, of a copolymer obtained by grafting onto a rubbery polymer (c) an acrylic monomer (d).

The copolymer (C) used in this invention has a core-shell structure in which the shell phase contains no styrene components; for example, it may have a structure comprising a shell phase of alkyl (meth)acrylate and a core in which the main component is a butadiene rubber. In the MBS resin according to the above-described prior-art, on the other hand, the shell phase contains styrene components. The inventors discovered that, by adding the copolymer (C) of this invention to the polycarbonate resin, it is possible to obtain a good impact resistance, and in particular a good impact resistance at low temperature, as well as a good moldability. This discovery ultimately led to the present invention.

The copolymer that is used as component (C) in this invention and is obtained by grafting onto the rubbery polymer (c) an acrylic monomer (d) is already known. This graft copolymer is cited, for example, in Japanese Published Unexamined Patent Application [Kokai] Nos. 61-81,455 (1986) and 1-141,944 (1989), and also U.S. Pat. No. 4,180, 494. Preferably at least 50 wt. % of the core consists of polymerized dienes. It is preferable that the core be comprised of polymerized conjugated diene units, or a copolymer composed of polymerized diene units and polymerized vinyl compound (preferably aromatic vinyl compound) units. Suitable conjugated dienes include butadiene, isoprene and 1,3-pentadiene. Examples of suitable vinyl compounds include styrene, α-methylstyrene, vinyltoluene, p-methylstyrene and the esters of (meth)acrylic acid.

The shell is preferably composed of a polymer product made of one or more monomers selected from the group comprising $C_1$–$C_6$ alkyl acrylates, $C_1$–$C_6$ alkyl methacrylates, acrylic acid, methacrylic acid, and mixtures of one or more of these monomers (in some cases, mixture with a crosslinking agent is also possible). Especially desirable monomers include methyl acrylate, ethyl acrylate, hexyl acrylate, methyl methacrylate, ethyl methacrylate, hexyl methacrylate, acrylic acid and methacrylic acid. The use of methyl methacrylate is preferable.

In addition to the above-mentioned monomers, the shell phase of the graft copolymer may contain also a crosslinking monomer in an amount of about 0.1– 2.5 wt. %, based on the weight of the graft copolymer. This crosslinking monomer is a polyethylenically unsaturated monomer that is addition polymerizable and has several groups that all polymerize at almost the same reaction rate. Suitable crosslinking monomers include the polyacrylic acid and polymethacrylic acid esters of polyols, such as butylene diacrylate and methacrylate, and trimethylolpropane trimethacrylate; and divinyl- and trivinylbenzene, vinyl acrylate, methacrylate and the like. Crosslinking monomers that are preferable for use are butylene diacrylate.

In the graft copolymer, there is generally no restriction on the ratio between the core and the shell phases, although it is preferable that the core represent about 40–95 wt. % and the shell layer represent about 5–60 wt. %.

The commercially available EXL2602™ (Kureha Chemical Industry) can be used as the above-mentioned graft copolymer.

The ingredient (A) used in this invention is a polycarbonate resin and/or a copolyester carbonate resin. The polycarbonate resin used in this invention is an aromatic polycarbonate prepared by a known phosgene process or a melt process (see, for example, Kokai Nos. 63-215,763 (1988) and 2-124,934 (1990)).

The copolyester carbonate resin used in this invention must have constituent units represented by above formulas (3) and (4). First, the constituent units represented by formula (3) consist of a diphenol component and a carbonate component. The diphenols that can be used to introduce the diphenol component are represented by the following formula (5)

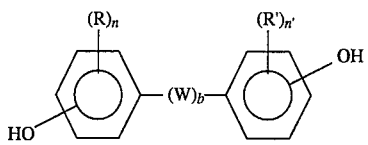

(where R, R', W, n, n' and b have the same meanings as indicated earlier). Examples of halogen atoms that may serve as R and R' include chlorine atoms and bromine atoms. Examples of monovalent hydrocarbon groups that may cited include alkyl groups having 1–12 carbons, such as methyl groups, ethyl groups, propyl groups and decyl groups; cycloalkyl groups having 4–8 carbons, such as cyclopentyl groups and cyclohexyl groups; aryl groups having 6–12 carbons, such as phenyl groups, naphthyl groups and biphenyl groups; aralkyl groups having 7–14 carbons, such as benzyl groups and cinnamyl groups; alkaryl groups such as tolyl groups and cumenyl groups. Of these, alkyl groups are preferable. The above-mentioned hydrocarbon groups may be cited as examples of the hydrocarbon groups on the hydrocarbonoxy group. Preferable examples of such hydrocarbonoxy groups include alkoxy groups, cycloalkyloxy groups, aryloxy groups, aralkyloxy groups, and alkaryloxy groups; of these, the use of alkoxy groups and aryloxy groups is preferable.

In cases where W is a divalent hydrocarbon group, this may be an alkylene groups having 1–30 carbons, such as a methylene group, an ethylene group, a trimethylene group or an octamethylene group; an alkylidene group having 2–30 carbons, such as an ethylidene group or a propylidene group; a cycloalkylene group having 6–16 carbons such as a cyclohexylene group or a cyclododecylene group; and a cycloalkylidene group such as a cyclohexylidene group.

Examples that may be cited of diphenols that are effective in this invention include 2,2-bis(4-hydroxyphenyl)propane (bisphenol A), 2,2-bis(3,5-dibromo-4-hydroxyphenyl)propane, 2,2-bis(3,5-dimethyl-4-hydroxyphenyl)propane, 1,1-bis(4-hydroxyphenyl)cyclohexane, 1,1-bis(3,5-dimethyl-4-hydroxyphenyl)cyclohexane, 1,1-bis(4,-hydroxyphenyl)decane, 1,4-bis(4-hydroxyphenyl)propane, 1,1-bis(4-hydroxyphenyl)cyclododecane, 1,1-bis(3,5-dimethyl-4-hydroxyphenyl)cyclododecane, 4,4-dihydroxydiphenyl ether, 4,4-thiodiphenol, 4,4-dihydroxy-3,3-dichlorodiphenylether and 4,4-dihydroxy-2,5-dihydroxydiphenyl ether. In addition, the diphenols cited in U.S. Pat. Nos. 2,999,835, 3,028,365, 3,334,154, and 4,131,575 can also be used.

Precursors for introducing the carbonate component that may be cited include phosgene and diphenyl carbonate.

Next, the constituent units shown in formula (4) consist of a diphenol component and a divalent acid component. Diphenols like those cited above can be used in the introduction of the diphenol ingredient. The monomer used to introduce the divalent acid ingredient is a divalent acid or an equivalent substance. The divalent acid is a fatty diacid having 8–20 carbons, and preferably 10–12 carbons. This divalent acid or its equivalent substance may be a straight-chain, branched, or cyclic substance. It is preferable that the fatty diacid be an α,ω-dicarboxylic acid. Examples of such divalent acids include straight-chain saturated fatty dicarboxylic acids such as sebacic acid (decanedioic acid), dodecanedioic acid, tetradecanedioic acid, octadecanedioic acid and eicosanedioic acid; sebacic acid and dodecanedioic acid are especially preferable. Equivalent substances that may be cited include acid halides such as acid chlorides of the above divalent acids; examples include diaromatic esters such as diphenyl esters. Here, the number of carbons in the ester portion of the ester does not include the number of carbons in the acid mentioned above. These divalent acids or their equivalent substances may be used alone or as combinations of two or more thereof.

In order to maintain the outstanding physical properties of the copolyester carbonate used as component (A), such as flowability, heat resistance, and mechanical properties comparable with those of polycarbonate, it is preferable that the above-mentioned two constituent units shown in formulas (3) and (4) be present in the following proportion. That is, the amount of the constituent unit represented by formula (4) should be 2–30 mol %, preferably 5–25 mol %, and most preferably 7–20 mol %, of the total amount of formulas (3) and (4).

The weight-average molecular weight of the copolyester carbonate is generally 10,000–100,000, and preferably 18,000–40,000. The weight-average molecular weight referred to here is measured by means of GPC (gel permeation chromatography) using a polystyrene corrected for polycarbonate use.

The above-mentioned copolyester carbonates can be prepared by a known polycarbonate preparation method such as a melt polymerization method or an interfacial polymerization method that uses phosgene. For example, these can be prepared by the method cited in the specifications of U.S. Pat. Nos. 4,238,596 (to Quinn), and 4,238,597 (to Quinn and Markezich). First, prior to the reaction of an ester-forming group with diphenol, an acid halide is formed, following which this is reacted with a phosgene. In Goldberg's basic solution method (U.S. Pat. No. 3,169,121 ), a pyridine solvent can be used, or use can be made of a dicarboxylic acid. A melt polymerization method that uses the diester (e.g., the diphenyl ester) of an α,ω-dicarboxylic acid (e.g., sebacic acid) can also be used. A preferable production method is the improved method in U.S. Pat. No. 4,286,083 (to Kochanowski). In this method, a lower diacid such as adipic acid is first rendered into the form of a salt (preferably an alkali metal salt such as the sodium salt), and added to a reactor in which diphenol is present. In the reaction with phosgene, the aqueous phase is maintained at an alkaline pH, and preferably at a pH of about 8–9, following which the pH is raised to 10–11 for the remainder of the reaction with phosgene, this being at a point where a minimum of about 5% [of the reaction] remains.

In cases that involve the use of an interfacial polymerization method, such as bischloroformate, it is preferable to use a common catalyst system that is well known in the synthesis of polycarbonate and copolyester carbonate. Examples that may be cited of major catalyst systems include amines such as tertiary amines, amidine and guanidine. Tertiary amines are generally used; of these the use of trialkylamines such as triethylamine is especially preferable.

The copolyester carbonate serving as component (A) has a sufficient impact strength even when it has phenols on the end, but when bulkier end groups such as p-t-butylphenol, isononylphenol, isooctylphenol, m- or p-cumylphenol (preferably, p-cumylphenol), and chromanyl compounds such as chroman are introduced, copolyester carbonates having even better low-temperature impact properties can be obtained.

In cases where component (A) includes both a polycarbonate and a copolyester carbonate, these two ingredients may be mixed in any ratio.

The intrinsic viscosity of component (A), as measured at 25° C. in methylene chloride, should preferably be 0.32–0.65 dl/g.

Component (B) is a copolymer which contains (a) an aromatic vinyl monomer ingredient, and (b) a vinyl cyanide monomer ingredient. Examples that may be cited of the aromatic vinyl monomer ingredient (a) include styrene, α-methylstyrene, o-, m- or p-methylstyrene, vinylxylene, monochlorostyrene, dichlorostyrene, monobromostyrene, dibromostyrene, fluorostyrene, p-tertbutylstyrene, ethylstyrene and vinylnaphthalene. One or more of these may be used. The use of styrene and α-methylstyrene is preferable.

Examples that may be cited of the vinyl cyanide monomer ingredient (b) include acetonitrile and methacrylonitrile. Any one or more of these may be used. There is no particular restriction on the mixing ratio of these, this being selected according to the application.

Although there is no particular restriction on the ratio in which ingredients (a) and (b) are compounded, it is preferable for this to be 5–50 wt. % of (a) and 5–50 wt. % of (b), and most preferable for this to be 92–65 wt. % of (a) and 8–35 wt. % of (b).

Preferable examples of (B) that may be cited include SAN resins (styrene-acrylonitrile copolymers).

There is no particular restriction on the method for preparing the copolymer serving as component (B), it being possible to use commonly known methods such as bulk polymerization, solution polymerization, bulk suspension polymerization and emulsion polymerization. It is also possible to obtain this by blending separately copolymerized resins.

The thermoplastic resin compositions of this invention can include, as optional ingredients for further enhancing the impact strength, up to 70 parts by weight, for example, of acrylonitrile-butadiene-styrene terpolymer (ABS) resin, acrylonitrile-ethylene-propylene-styrene copolymer or the like per 100 parts by weight of components (A) and (B) combined.

In the resin compositions of this invention, the mixing ratio between components (A) and (B) is 1–99 pans by weight of (A) and 99–1 pans by weight of(B), and preferably 97–10 parts by weight of(A) and 3–90 parts by weight of (B). The effects of this invention cannot be fully manifested outside of the above range, and so this is not desirable. The mixing ratio of component (C) is 1–40 parts by weight, and preferably 1–30 pans by weight, per 100 pans by weight of components (A) and (B) combined. When this is less than 1 part by weight, the effects of this invention cannot be fully manifested, which is undesirable. When this exceeds 40 parts by weight, the rigidity decreases, which also is undesirable.

In the resin compositions of this invention, aside from the above ingredients, various additives known to those conversant in the art may be included within a range that does not compromise the physical properties of the resin composition. Examples of such additives include pigments and dyes; reinforcing agents and fillers such as glass fibers, metal fibers, metal flakes, carbon fibers, glass flakes and milled glass; as well as heat stabilizers, antioxidants, ultraviolet light absorbers, light stabilizers, mold release agents, plasticizers, antistatic agents and fire retardants.

There is no particular restriction on the methods of preparing the resin compositions according to this invention, it being possible to employ commonly known methods. Examples that may be cited include methods whereby components (A), (B) and (C) which have been uniformly mixed in the state of a pellet, powder or small fragments are melt-kneaded by means of a single-screw or a multiple-screw extruder having a sufficient kneading capability, and methods whereby melt-kneading is carried out using a Banbury mixer or a rubber roller.

This invention shall now be illustrated more concretely by means of examples thereof and comparative examples, although it shall be understood that the scope of the invention is in no way limited by these examples.

Use was made of the following compounds in the examples of the invention and the comparative examples described below.

Component (A):

Polycarbonate: A polycarbonate (abbreviated as PC in Table 1) prepared by the melt polymerization of bisphenol A and diphenyl carbonate, and having an intrinsic viscosity [η] (as measured in methylene chloride at 25° C.) of 0.50 dl/g.

Copolyester carbonate: A copolyester carbonate prepared in the following manner. Dodecanedioc acid (DDDA; 7.2 g–31 mmol) and 2.7 g (68 mmol) of NaOH tablets were dissolved in 180 ml of water, thereby preparing the disodium salt of DDDA. Next, a Claisen adapter equipped with stirring vanes, a pH measuring terminal, an introducing tube, and a dry-ice condenser was mounted on a 2000-ml Morton flask having a sample removal opening at the bottom and five necks at the top. This polymerization flask was charged with 71 g (311 mmol) of bisphenol A, 0.9 ml of triethylamine, 2.0 g (9 mmol) of p-cumylphenol, 220 ml of methylene chloride, and the disodium salt of DDDA prepared earlier. Next, phosgene was poured into this flask at a rate of 2 g/min. At this time, the solution was maintained at pH 8 for 10 minutes while adding a 50% NaOH aqueous solution via the introducing tube. Then, while continuing to pour in phosgene, the 50% NaOH aqueous solution was added via the introducing tube, the pH of the solution was set at 10.5, and this pH was maintained for 10 minutes. The total amount of phosgene used was 40 g (400 mmol). After completion of the reaction, the pH of the solution was adjusted to 11– 11.5, and the organic solvent phase was separated from the aqueous phase. After washing the organic solvent phase three times with 2% hydrochloric acid, then washing it five times with 300 ml of ion-exchanged water, it was dried with anhydrous magnesium sulfate and filtered. This was poured into 1500 ml of methanol, and the polymer precipitated. The polymer thus obtained was separated by filtration, washed once with 500 ml of methanol, then washed four times with 500 ml of ion-exchanged water, after which it was dried at 110° C. for 15 hours. In this way, a copolyester carbonate was obtained that had structural units with formulas (6) and (7) below in a molar ratio of 90:10. The intrinsic viscosity (as measured at 25° C. in methylene chloride) of this copolyester carbonate (abbreviated as CPEC in Table 1) was 0.45 dl/g.

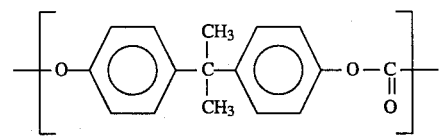

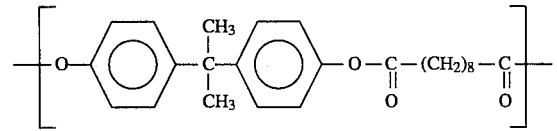

Component (B):

Styrene-acrylonitrile copolymer (SAN resin): SR30B ™

("Ube Saikon" KK) (abbreviated as SAN in Table 1.
Component (C):

Methyl methacrylate-butadiene copolymer: EXL2602™ (Kureha Chemical Industry).

Comparative Ingredients:

Methyl methacrylate-butadiene rubber-styrene resin (MBS resin): Two types were used: KM653™ (Rohm and Haas Chemical Company) (abbreviated as MBS-1 in Table 1) and "Kane-ace" B-56™ (Kanegafuchi Chemical Industry) (abbreviated as MBS-2 in Table 1).

Optional Ingredients:

Acrylonitrile-butadiene rubber-styrene resin (ABS resin): UXO50™ ("Ube Saikon" KK) (abbreviated as ABS in Table 1).

APPLICATION EXAMPLES 1–5,
COMPARATIVE EXAMPLES 1–7

The various ingredients in the amounts (parts by weight) shown in Tables 1 and 2 were kneaded and extruded using a twin-screw extruder having a diameter of 30 mm at a barrel temperature setting of 250° C. and a rotational speed of 150 rpm, thereby giving pellets. Test pieces were then fabricated by molding the pellets thus formed with an injection molding machine set at a cylinder temperature of 250° C. and a mold temperature of 60° C., and the test pieces were furnished for testing the various properties.

The various properties obtained in the examples and the comparative examples were evaluated by means of the following test methods.

Izod Impact Strength (NIZ): The ⅛-inch bar notched Izod impact strength was measured at −40° C. in accordance with ASTM D256.

Flow Length: The flow length was measured by carrying out spiral flow molding. The molding conditions used here consisted of a cylinder temperature of 260° C., a mold temperature of 80° C., an injection pressure of 1200 kg/cm², and a molding wall thickness of 3 mm.

Ductile Fracture Ratio (%): The state of the fracture plane was examined both by unaided eye and with a microscope, and the proportion of test pieces that underwent ductile fracturing was calculated.

The results of these evaluations are presented in Table 1.

Thus, the resin compositions according to this invention had an excellent impact resistance at low temperatures, and an excellent moldability.

The polycarbonate resin compositions of this invention had an excellent impact resistance at low temperatures, as well as an excellent moldability.

We claim:

1. A thermoplastic resin composition comprising (A) 1–99 parts by weight of a polycarbonate resin or a copolyester carbonate resin having structural units represented by formula (1)

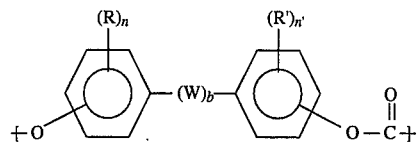

and formula (2)

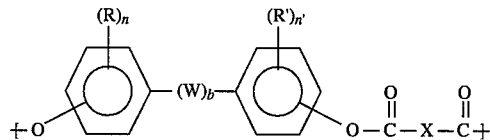

where R and R' each independently represent halogen atoms, monovalent hydrocarbon groups or hydrocarbon oxy groups; W is a divalent hydrocarbon group, —S—, —S—S—, —O—, —S(=O)—, —(O=)S(=O)— or —C(=O)—, n and n' are each independently integers from 0 to 4; X is a divalent aliphatic group having 6-18 carbons; and b is 0 or 1; wherein formula (2) is from 2 to 30 mol percent of the total amount of formulas (1) and (2), the weight-average molecular weight of the copolyester carbonate resin is from 10,000 to 100,000 as measured by means of gel permeation chromatography using a polystyrene corrected for polycarbonate use and the intrinsic viscosity of component (A) as measured at 25° C. in methylene chloride is 0.32 to 0.65 dl/g;

(B) 99–1 parts by weight of a copolymer containing as the

TABLE 1

| | Examples of the Invention | | | | | Comparative Examples | | | | | | | | | |
|---|---|---|---|---|---|---|---|---|---|---|---|---|---|---|---|
| | 1 | 2 | 3 | 4 | 5 | 1 | 2 | 3 | 4 | 5 | 6 | 7 | 8 | 9 | 10 |
| PC | 80 | 80 | — | — | 80 | 80 | 80 | 80 | — | — | 80 | 80 | 100 | 100 | 100 |
| CPEC | — | — | 80 | 80 | — | — | — | — | 80 | 80 | — | — | — | — | — |
| SAN | 20 | 20 | 20 | 20 | 20 | 20 | 20 | 20 | 20 | 20 | — | — | — | — | — |
| ABS | — | — | — | — | 4 | — | — | — | — | — | 4 | 4 | — | — | — |
| Component (C) | 16 | 12 | 16 | 12 | 12 | — | — | — | — | — | — | — | 16 | — | — |
| MBS-1 | — | — | — | — | — | 16 | 12 | — | 16 | — | 12 | — | — | 16 | — |
| MBS-2 | — | — | — | — | — | — | — | 16 | — | 16 | — | 12 | — | — | 16 |
| NIZ (kg · cm/cm) | 48 | 40 | 46 | 42 | 53 | 18 | 14 | 18 | 18 | 16 | 17 | 18 | 58 | 53 | 55 |
| Flow length (mm) | 250 | 270 | 330 | 340 | 260 | 260 | 270 | 250 | 350 | 340 | 250 | 260 | 180 | 190 | 190 |
| Ductile fracture ratio (%) | 100 | 100 | 100 | 100 | 100 | 0 | 0 | 0 | 0 | 0 | 0 | 0 | 100 | 100 | 100 | constituent components of the copolymer:
(a) an aromatic vinyl monomer component, and
(b) a vinyl cyanide monomer component; and (C) 1–40 parts by weight, based on 100 parts by weight of (A) and (B) combined, of a copolymer having a core-shell structure in which the shell is an acrylic monomer (d) free of styrene components and is grafted onto the core rubbery polymer (C) of a polymerized conjugated diene units or a copolymer of polymerized diene units and polymerized vinyl units.

2. A thermoplastic resin composition according to claim 1, whereby the acrylic monomer (d) is methyl methacrylate.

3. The composition of claim 1, wherein the conjugated diene is selected from the group consisting of butadiene, isoprene and 1,3-pentadiene and the vinyl is selected from the group consisting of styrene, alpha-methylstyrene, vinyltoluene, paramethylstyrene and an ester of (meth) acrylic acid.

4. The composition of claim 1 wherein the shell is a polymer made from monomer units selected from the group consisting $C_1$–$C_6$ alkyl acrylates, $C_1$–$C_6$ alkyl methacrylates, acrylic acid, methacrylic acid and mixtures thereof.

5. The composition of claim 1 wherein the shell additionally comprises from about 0.1–2.5 weight percent, based on the weight of the copolymer, of a crosslinking monomer.

6. The composition of claim 5 wherein the crosslinking monomer is selected from the group consisting of butylene diacrylate, butylene methacrylate, trimethylol propane methacrylate, divinylbenzene, trivinylbenzene, vinyl acrylate and vinyl methacrylate.

7. The composition of claim 1 wherein the core is about 40 to 95 weight percent of the core-shell structure and the shell is about 5 to 60 weight percent of the core-shell structure.

8. The composition of claim 1 wherein the aromatic vinyl monomer component is selected from the group consisting of styrene, alpha-methylstyrene, orthomethylstyrene, metamethylstyrene, paramethyl styrene, vinylxylene, monochlorostyrene, dichlorostyrene, monobromostyrene, dibromostyrene, fluorostyrene, paratertiary butylstyrene, ethylstyrene and vinylnaphthalene and the vinyl cyanide monomer component is acrylonitrile or methacrylonitrile.

9. The composition of claim 1 wherein component (a) is from 92 to 65 percent by weight of copolymer (B) and component (b) is from 8 to 35 percent by weight of copolymer (B).

10. The composition of claim 1 wherein resin (A) is from 97 to 10 parts by weight of the combined weight of resin (A) and copolymer (B) and copolymer (B) is from 3 to 90 parts by weight of the combined weight of resin (A) and copolymer (B).

* * * * *